Oct. 13, 1925.
H. O. HEM
WEIGHING SCALE
Filed Dec. 3, 1923
1,556,933
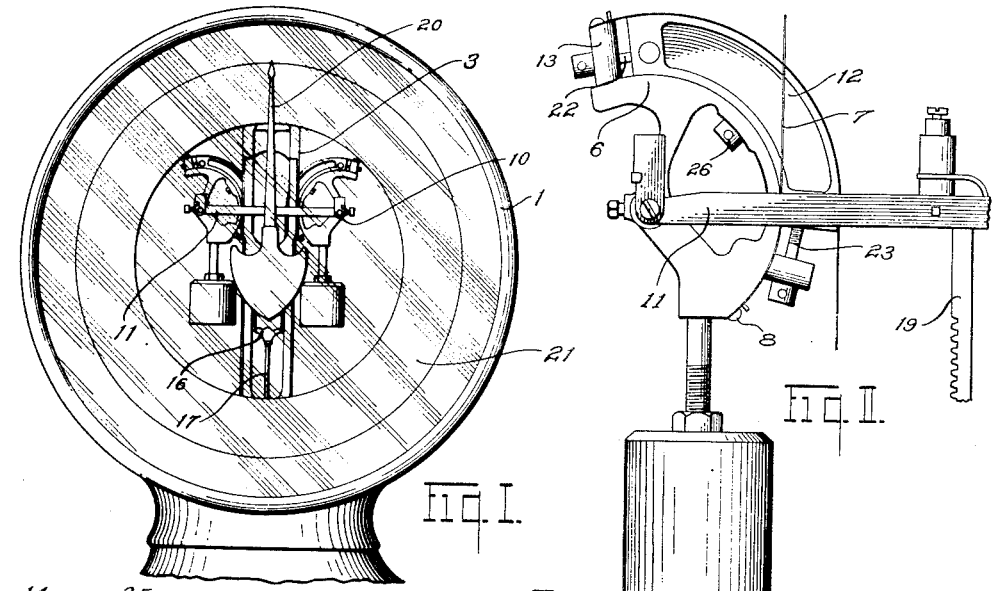
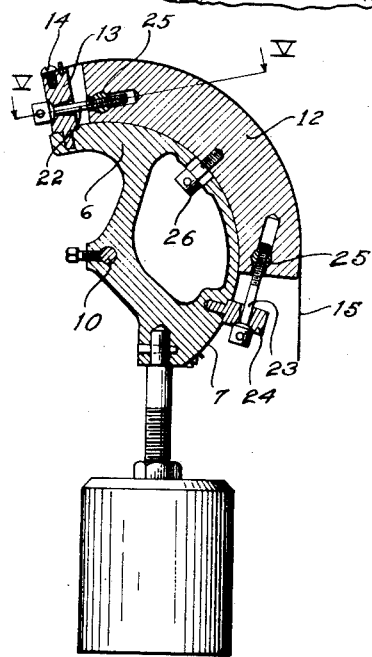
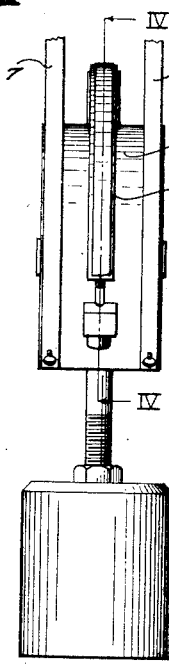
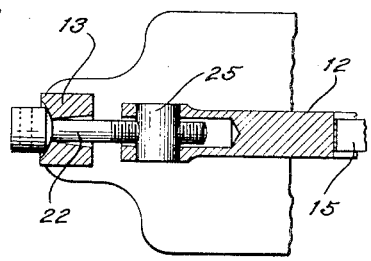
Inventor
HALVOR O. HEM.
By C. W. Marshall
Attorney Patented Oct. 13, 1925.

1,556,933

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed December 3, 1923. Serial No. 678,081.

*To all whom it may concern:*

Be it known that I, HALVOR O. HEM, a citizen of the United States, residing at Toledo, in the county of Lucas and State of Ohio, have invented certain new and useful Improvements in Weighing Scales, of which the following is a specification.

This invention relates to weighing scales of the so-called pendulum type, and particularly to a weighing scale pendulum having an eccentric power sector so arranged that the high point of the power sector may be angularly adjusted.

In the typical load-counterbalancing pendulum such as is shown in the patent to Hapgood No. 1,203,611, issued November 7, 1916, a flexible metallic band or ribbon overlies the curved face of the power sector and is secured thereto, the power sector being fixed to a fulcrum sector. The purpose of the angular adjustment of the power sector is to move it to such position that the flexible band or ribbon will pull off of certain portions of its curved face during a weighing operation. In the forms of pendulums that have heretofore been used in weighing scales the adjustment is made by moving the center of mass of the pendulum. If the center of mass of the pendulum be moved outwardly the pendulum will, when released, swing to bring the center of mass approximately to its original position and the power and fulcrum sectors will swing up so that a different part of the fulcrum sector will be brought into play during a weighing operation. Since, however, the indicator in this type of scale is moved whenever the fulcrum sector swings, the adjustment of the pendulum causes the indicator to be moved from its original zero position.

One of the principal objects of my invention is the provision of means for adjusting a pendulum power sector without affecting the zero balance of the scale.

A more specific object of the invention is the provision of means for adjusting the angular position of the power sector without changing the relative positions of the pendulum and fulcrum sector.

Another object of the invention is the provision of an improved means for adjusting a pendulum power sector which is easily manipulated and not liable to accidentally get out of adjustment.

And still another object of the invention is the provision of a device of this character which is not only efficient from the standpoint of operation but which is capable of economical production.

Other objects and advantages will be apparent from the following description, in which reference is had to the accompanying drawings illustrating a preferred embodiment of my invention and wherein similar reference numerals designate similar parts throughout the several views.

In the drawings:—

Figure I is an elevational view of the load-offsetting and indicating mechanism of a weighing scale of the portable type;

Figure II is an enlarged elevational view of one of the load-offsetting pendulums;

Figure III is an enlarged side elevation of the pendulum shown in Figure II;

Figure IV is an enlarged sectional view taken substantially on the line IV—IV of Figure III; and Figure V is an enlarged detail sectional view taken substantially on the line V—V of Figure IV.

Referring to the drawings in detail, I have shown my invention as applied to a scale of the type having the load-offsetting mechanism enclosed within a substantially watch-case-shaped housing 1 and adapted to rest upon a suitable column or other suitable support arranged in juxtaposition to the platform and platform lever mechanism of the scale (not shown). It is to be understood that any suitable platform and platform lever mechanism may be employed, the weighing mechanism herein shown being designed to operate satisfactorily when employed in various forms of scales, as, for example, dormant, counter or hanging scales.

The weighing mechanism of the scale comprises a rectangular frame 3 having a plurality of vertical pillars 4 suitably supported within the housing 1, the pillars forming bearings or tracks for the fulcrum sectors 6 forming parts of the oppositely disposed pendulums which are suspended in position by flexible bands or ribbons 7 of steel or other suitable metal fastened to the lower extremity of the sectors 6 by means of screws 8 and secured at their upper ends to the pillars, being thus interposed between the sectors and the pillars. The fulcrum sectors 6 are fixed upon shafts 10, the shafts being connected together by crossbars 11, substantially as illustrated in Figure I, the sector shafts 10 and the crossbars 11 forming a rectangular frame pivotally connected to the pendulums and indicator operating mechanism (not shown).

Mounted upon the arcuate periphery of each of the fulcrum sectors 6 is a sector 12 having an arcuate surface of somewhat greater radius than that of the fulcrum sector but much narrower. This sector 12 is herein referred to as the power sector. It is so positioned as to extend between the pillars 4 of the pendulum supporting frame. Fixed to the fulcrum sector adjacent the upper end thereof is a finger 13 to which is fixedly secured by means of a screw 14 a flexible ribbon 15 similar to the ribbons 7. This ribbon extends over the peripheral face of the power sector and is connected to a head 16 on the upper end of a steelyard rod 17 which extends downwardly to the platform lever mechanism.

The crossbar or compensating bar 11 which is pivotally connected to the pendulums at the centers of curvature of the fulcrum sectors 6 extends from one pendulum to the other, and connected to the compensating bar 11 is a rack bar 19 which meshes with a pinion (not shown) fixed to a rotatable shaft that carries the indicator hand 20. As the shaft turns the indicator hand 20 is caused to swing over a dial 21.

When a load is placed upon the scale the steelyard rod 17 and ribbons 15 are pulled downwardly, thus swinging the pendulums outwardly and causing the fulcrum sectors 6 to roll upwardly on the ribbons 7. As the fulcrum sectors 6 roll upwardly on the ribbons 7 the compensating bar 11 and rack bar 19 are carried vertically upwardly and the indicator hand is thus caused to swing to proper indicating position.

If the curved faces of the fulcrum sector 6 and the power sector 12 were concentric, the indicator hand 20 would not swing through equal arcs for equal increments of load, and it would, therefore, be necessary to space the graduations on the chart 21 unequally. It has been found, however, that if the curved faces of the fulcrum and power sectors of a pendulum of this type be eccentrically arranged in the proper relation to each other and to the position of the center of mass of the pendulum, the fulcrum sector will roll upwardly on the ribbons 7 equal distances for equal increments of load, even though the curved faces of the fulcrum and power sectors be curved along the arcs of true circles.

In order to provide for relative angular adjustment of the high point of the power sector and the center of mass of the pendulum about the center of curvature of the fulcrum sector, I have so constructed and mounted the power sector that it may be moved over the face of the fulcrum sector, and have provided means for moving it and reliably holding it in adjusted position, consisting of a screw 22 which connects one end of the power sector with the finger 13 and a screw 23 which connects the other end of the power sector with a lug 24 fixed to the fulcrum sector. The openings in the finger 13 and the lug 24 through which the screws 22 and 23 pass are shaped, as shown in Figures IV and V, to allow the screws 22 and 23 to have a slight swinging movement as they are turned in the openings, and a similar swinging movement relative to the power sector 12 is provided for by threading the screws into cylindrical anchors 25 which are mounted for rocking movement in the power sector.

The flexible ribbon 15 overlies the curved face of the power sector 12 and is secured at its upper end, as shown in Figures II and IV, to the finger 13, so that the position of the ribbon 15 is not appreciably changed by adjustment of the power sector 12. When one of the screws 22, 23 is loosened and the other tightened, the power sector 12 is moved around the periphery of the fulcrum sector 6 and its center is thus moved about the center of curvature of the fulcrum sector 6. When a scale is balanced at zero and an adjustment of the power sector is subsequently made, the center of mass of the pendulum remains in its original position or so nearly in its original position that no new zero adjustment is necessary.

As additional insurance that the power sector 12 will remain in its position of adjustment, a locking screw 26 is passed through an elongated opening in the fulcrum sector 6 and threaded into the power sector 12. By turning up this screw the power sector 12 may be locked in any adjusted position.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a weighing scale pendulum having a weight, a member fixed thereto, a fulcrum sector formed on said member, and a second member mounted for slidable adjustment on the first said member and having a face curved eccentrically with relation to the face of the fulcrum sector to form a power sector.

2. In a device of the class described, in combination, a weighing scale pendulum having a weight, a fulcrum sector fixed thereto, a power sector having a curved face engaging the curved face of said fulcrum sector, said power sector also having a face curved eccentrically to the face of said fulcrum sector, and means for adjusting said power sector about the curved face of said fulcrum sector.

3. In a device of the class described, in combination, a weighing scale pendulum having a relatively wide fulcrum sector, a relatively narrow power sector having a face fitting the curved face of said fulcrum sector, said power sector also having a face curved eccentrically relatively to the curved face of said fulcrum sector, means for adjusting said power sector about the curved face of said fulcrum sector, a pair of flexible supporting members overlying the curved face of said fulcrum sector, and a flexible power member overlying the face of said power sector.

4. In a device of the class described, in combination, a weighing scale pendulum having a relatively wide fulcrum sector, a relatively narrow power sector having a face fitting the curved face of said fulcrum sector, said power sector also having a face curved eccentrically relatively to the curved face of said fulcrum sector, means for adjusting said power sector about the curved face of said fulcrum sector, a pair of flexible supporting members overlying the curved face of said fulcrum sector, and a flexible power member overlying the face of said power sector, said flexible power member being secured to a part of said pendulum other than said power sector.

5. In a device of the class described, in combination, a weighing scale pendulum having a fulcrum sector and a power sector, said power sector having a face engaging said fulcrum sector and a face curved eccentrically to the face of said fulcrum sector, and means connecting said fulcrum sector and said power sector and adapted to move said power sector in opposite directions over the face of said fulcrum sector.

6. In a device of the class described, in combination, a fulcrum sector, a power sector having a face engaging the face of said fulcrum sector and a face curved eccentrically to the face of said fulcrum sector, projections on said fulcrum sector adjacent the ends of said power sector, and threaded members connecting said projections and said power sector.

7. In a device of the class described, in combination, a fulcrum sector, a power sector having a face engaging the face of said fulcrum sector and a face curved eccentrically to the face of said fulcrum sector, projections on said fulcrum sector adjacent the ends of said power sector, means connected to said power sector for oscillatory movement, and screws passing through said projections and threaded into said means.

8. In a device of the class described, in combination, a fulcrum sector, a power sector having a face engaging the face of said fulcrum sector and a face curved eccentrically to the face of said fulcrum sector, projections on said fulcrum sector adjacent the ends of said power sector, means connected to said power sector for oscillatory movement, screws passing through said projections and threaded into said means, whereby said power sector may be adjusted, and means for locking said power sector in adjusted position.

HALVOR O. HEM.